United States Patent
Sandu (10) Patent No.: US 9,746,250 B2
(45) Date of Patent: Aug. 29, 2017

(54) LIQUID-CRYOGEN INJECTION COOLING DEVICES AND METHODS FOR USING SAME

(75) Inventor: Constantine Sandu, Solon, OH (US)

(73) Assignee: Nestec S.A., Vevey (CH)

( * ) Notice: Subject to any disclaimer, the term of this patent is extended or adjusted under 35 U.S.C. 154(b) by 669 days.

(21) Appl. No.: 14/238,112

(22) PCT Filed: Jul. 13, 2012

(86) PCT No.: PCT/EP2012/063770
§ 371 (c)(1),
(2), (4) Date: Feb. 10, 2014

(87) PCT Pub. No.: WO2013/020775
PCT Pub. Date: Feb. 14, 2013

(65) Prior Publication Data
US 2014/0166238 A1    Jun. 19, 2014

Related U.S. Application Data

(60) Provisional application No. 61/522,545, filed on Aug. 11, 2011.

(51) Int. Cl.
*F28F 1/14* (2006.01)
*F28F 1/10* (2006.01)
(Continued)

(52) U.S. Cl.
CPC ........ *F28F 1/10* (2013.01); *A23L 3/22* (2013.01); *A23L 3/361* (2013.01); *A23L 3/375* (2013.01); *B01F 5/0647* (2013.01); *B01F 15/065* (2013.01); *F25D 3/10* (2013.01); *F28C 3/04* (2013.01); *B01F 2015/061* (2013.01); *F28D 7/02* (2013.01); *F28D 2021/0052* (2013.01)

(58) Field of Classification Search
CPC .......... F25D 3/10; B01F 3/04503; B01F 5/00; B01F 2005/025; A23L 2/12; A23L 3/375
USPC ........... 165/184; 62/52.1, 74, 533, 534, 535, 62/536, 600, 614, 616
See application file for complete search history.

(56) References Cited

U.S. PATENT DOCUMENTS 2,995,016 A * 8/1961 Gold .................. A23L 2/12
  62/123
3,927,868 A * 12/1975 Moore ................. B01F 3/10
  206/221

(Continued)

FOREIGN PATENT DOCUMENTS

EP    1734320    12/2006

*Primary Examiner* — Len Tran
*Assistant Examiner* — Gustavo Hincapie Serna
(74) *Attorney, Agent, or Firm* — K&L Gates LLP (57) ABSTRACT

Heat exchange devices (30) and methods of using same are provided. In a general embodiment, the present disclosure provides for heat exchange devices (30) that are cooling devices having a double helical coil (32) in a phase-mixing-cooling section, a helical coil (36) in a phase-separation-cooling section, and a back-pressure valve (34) intermediate the two coils (32,36). The cooling devices provide maximum extraction of the heat content from a heated food product using a direct-injected liquid cryogen, and complete separation of the gaseous cryogen phase from the cooled product, while avoiding the formation of a stable foam. Hybrid direct-indirect cooling devices are also provided, as well as methods for using same.

7 Claims, 7 Drawing Sheets

(51) Int. Cl.
*A23L 3/22* (2006.01)
*B01F 5/06* (2006.01)
*B01F 15/06* (2006.01)
*F25D 3/10* (2006.01)
*F28C 3/04* (2006.01)
*A23L 3/36* (2006.01)
*A23L 3/375* (2006.01)
*F28D 7/02* (2006.01)
*F28D 21/00* (2006.01)

(56) References Cited

U.S. PATENT DOCUMENTS

| | | | | |
|---|---|---|---|---|
| 4,569,204 A | * | 2/1986 | Ott | A23B 4/062 62/374 |
| 4,952,224 A | * | 8/1990 | Lilakos | A23D 9/05 264/28 |
| 5,203,891 A | * | 4/1993 | Lema | B01D 45/12 55/460 |
| 5,575,909 A | * | 11/1996 | Foster | B01D 17/0208 210/304 |
| 6,331,072 B1 | | 12/2001 | Schierholz et al. | |
| 6,632,014 B2 | * | 10/2003 | Steinberg | B01F 3/10 366/315 |
| 6,632,370 B2 | * | 10/2003 | Natarius | B01D 53/14 210/170.08 |
| 6,895,764 B2 | * | 5/2005 | Viegas | B60H 1/00257 62/237 |
| 7,131,278 B2 | * | 11/2006 | Svensson | F17C 5/02 62/50.1 |
| 2001/0048900 A1 | * | 12/2001 | Bardell | B01D 11/00 422/400 |
| 2002/0129613 A1 | * | 9/2002 | Viegas | B60H 1/00014 62/239 |
| 2010/0264073 A1 | * | 10/2010 | Teng | A01K 63/042 210/136 |
| 2010/0276819 A1 | * | 11/2010 | Teng | A61H 33/027 261/31 |

* cited by examiner

LIQUID-CRYOGEN INJECTION COOLING DEVICES AND METHODS FOR USING SAME

CROSS REFERENCE TO RELATED APPLICATIONS

The present application is a National Stage of International Application No. PCT/EP2012/063770, filed on Jul. 13, 2012, which claims priority to U.S. Provisional Application No. 61/522,545, filed Aug. 11, 2011, the entire contents of which are being incorporated herein by reference.

BACKGROUND

The present disclosure generally relates to food technologies. More specifically, the present disclosure relates to direct-cryogen injection cooling devices comprising a double-helical (e.g., s-shaped) coil, a backpressure valve, and a helical (e.g., circular) coil, wherein the devices allow for maximum heat extraction from a heated food product using a direct-injected liquid cryogen, followed by a complete separation of the gaseous cryogen phase from the cooled food product, while avoiding the formation of a stable foam.

An example of a direct-cryogen injection cooling device is the Nitrogen Injection System manufactured by Pick Heaters, Inc. of West Bend, Wis. The Nitrogen Injection System ("NIS") is essentially a modification of the traditional direct steam injection ("DSI") system that is widely utilized throughout the food processing industry. According to the design of the DSI system, a multiple orifice steam injector (with hundreds of small orifices), in conjunction with a helical-flights mixer, ensures intimate blending of the steam and the product, resulting in 100% heat transfer. By comparison, the NIS by Pick Heaters, Inc. utilizes the same mechanical design, as the one described for the DSI system, whereby a liquid-nitrogen stream now is supplied to the multiple orifice injector, instead of steam.

Another example of a direct-cryogen injection cooling device is disclosed in European Patent Application EP 1 734 320 to Rosenbaum et al. ("Rosenbaum"). Rosenbaum relates to a continuous process for rapid cooling of a flowable material by mixing the material with a liquid cryogen, while the material and the cryogen flow through an inline continuous mechanical mixer. The discharge from the inline continuous mechanical mixer may flow into a product receiver to disengage and exhaust the gaseous cryogen from the cooled product. The inline continuous mechanical mixer may operate at rotational speeds of 400-2000 RPM.

There exists a need for an energy efficient direct-cryogen injection cooling device that is able to maximize heat extraction from a heated food product using a direct-injected liquid cryogen and to provide a complete separation of the gaseous cryogen phase from the cooled food product, while avoiding the formation of a stable foam.

SUMMARY

In a general embodiment, the present disclosure provides a heat exchange device having a double-helical pipe, a helical pipe and an intermediate pipe. The double-helical pipe is configured to receive at least one composition therein. The helical pipe is in fluid communication with, and located downstream of, the double-helical pipe. The intermediate pipe is in fluid communication with, and located between, the double-helical pipe and the helical pipe, and the intermediate pipe includes a backpressure valve thereon.

In an embodiment, the heat exchange device further includes first and second inlet valves at an inlet portion of the double-helical pipe.

In an embodiment, the first inlet valve is configured for receiving a first composition and the second inlet valve is configured for receiving a second composition. The first composition may be a heated, pumpable food product and the second composition may be a liquid cryogen.

In an embodiment, the helical pipe is configured to dispense a cooled, pumpable food product and a gaseous cryogen phase.

In an embodiment, the double-helical pipe comprises a phase-mixing-cooling section of the device, and the helical pipe comprises a phase-separation-cooling section of the device.

In another embodiment, a method for direct liquid-cryogen injection cooling is provided. The method includes injecting a heated product and a liquid cryogen into a double-helical pipe to form a two-phase mixture therein, causing the two-phase mixture to traverse the double-helical pipe and a backpressure valve located downstream of the double-helical pipe, causing the two-phase mixture to traverse a helical pipe located downstream of the backpressure valve, wherein the two-phase mixture is separated within the helical pipe into a cooled product and a gaseous cryogen phase, and dispensing the cooled product and the gaseous cryogen phase from the helical pipe.

In an embodiment, the double-helical pipe comprises a phase-mixing-cooling section of the device. The double-helical pipe may be configured to force the heated product and the liquid cryogen to mix to form the two-phase mixture and to exchange a maximum amount of heat between the two phases.

In an embodiment, the helical pipe comprises a phase-separation-cooling section of the device. The helical pipe may be configured to induce a two-phase flow between the cooled product and the gaseous cryogen phase, wherein the cooled product flows at the outer portion of the interior of the helical pipe and wherein the gaseous cryogen phase flows at the inner portion of the interior of the helical pipe.

In an embodiment, the heated product and the liquid cryogen are injected into the double-helical pipe through first and second inlet valves, respectively.

In an embodiment, the backpressure valve is configured to increase the residence time of the two-phase mixture within the double-helical pipe.

In yet another embodiment, a hybrid direct-indirect heat exchange device is provided. The device includes a double-helical pipe housed within a fluid-tight chamber, a helical pipe and an intermediate pipe. The double-helical pipe is configured to receive at least one composition therein. The helical pipe is in fluid communication with, and located downstream of, the double-helical pipe. The intermediate pipe is in fluid communication with, and located between, the double-helical pipe and the helical pipe, the intermediate pipe having a backpressure valve thereon.

In an embodiment, the fluid-tight chamber comprises an inlet configured for receiving a cooling medium and an outlet configured for dispensing the cooling medium.

In an embodiment, the helical pipe is housed within a second fluid-tight chamber having an inlet configured for receiving a cooling medium and an outlet configured for dispensing the cooling medium.

In yet another embodiment, a hybrid direct-indirect heat exchange device is provided. The device includes an inner double-helical pipe housed within an outer double-helical pipe, the inner double-helical pipe configured to receive at least one composition therein, a helical pipe in fluid communication with, and located downstream of, the inner and outer double-helical pipes and an intermediate pipe in fluid communication with, and located between, the inner and outer double-helical pipes and the helical pipe, the intermediate pipe having a backpressure valve thereon.

In an embodiment, the outer double-helical pipe includes an inlet configured for receiving a cooling medium and an outlet configured for dispensing the cooling medium.

In an embodiment, the helical pipe is housed within an outer helical pipe including an inlet configured for receiving a cooling medium and an outlet configured for dispensing the cooling medium.

In an embodiment, the devices of the present disclosure may be used as cooling devices, heating devices, or combinations thereof.

An advantage of the present disclosure is to provide improved cooling devices.

Another advantage of the present disclosure is to provide improved heat exchangers.

Yet another advantage of the present disclosure is to provide improved devices for producing food products.

Still yet another advantage of the present disclosure is to provide improved methods for manufacturing food products.

Another advantage of the present disclosure is to provide improved methods for cooling food products.

Yet another advantage of the present disclosure is to provide hybrid direct-indirect injection cooling devices.

Additional features and advantages are described herein, and will be apparent from the following Detailed Description and the figures.

DETAILED DESCRIPTION

Figure 1:
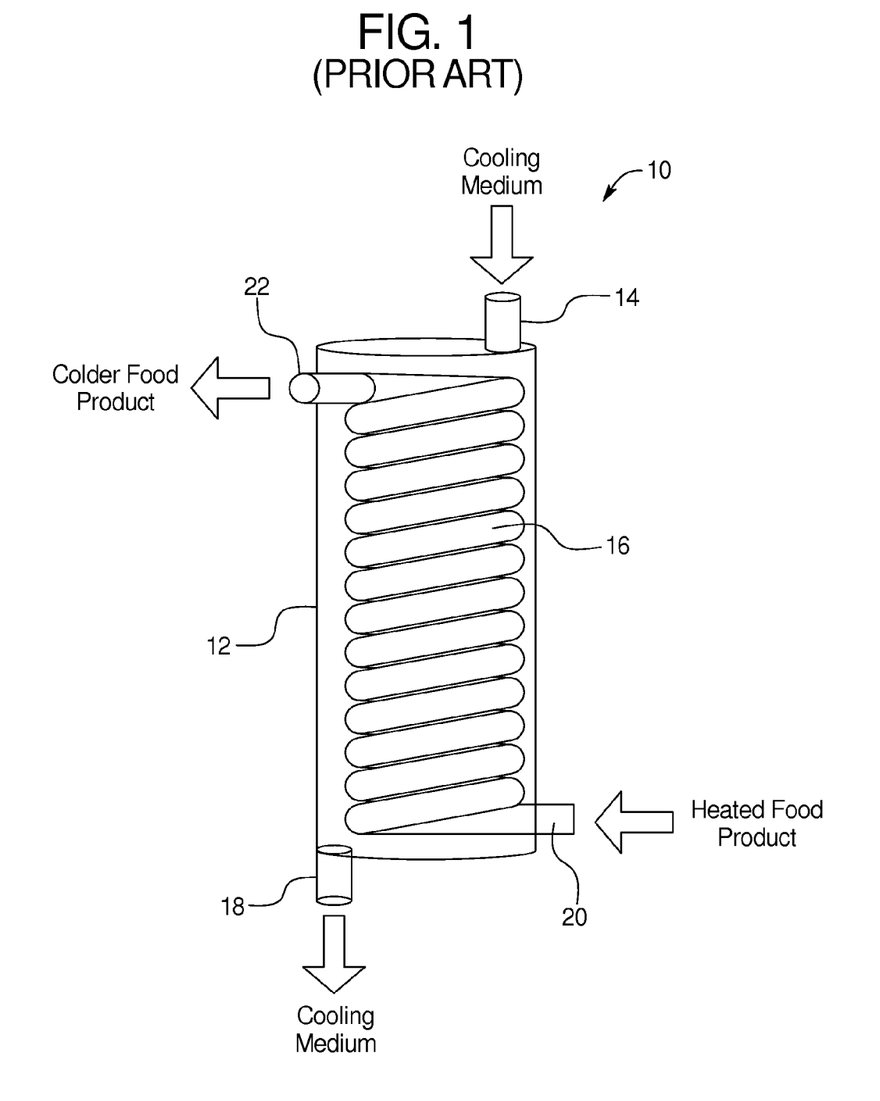
FIG. 1 illustrates a side view of a heat exchanger of the prior art.

Heat exchangers have been widely used in the food industry for quite some time. For example, FIG. 1 illustrates a known shell and tube heat exchanger. As is shown in FIG. 1, cooling media may enter shell 12 through a shell fluid inlet 14, traverse the exterior of tubes 16 (e.g., coils) and interior of shell 12, and exit shell 12 at the shell fluid outlet 18. In a similar manner, sterilized food product may enter tubes 16 through a tube fluid inlet 20, traverse the interior of tubes 16, and exit tubes 16 at a tube fluid exit 22. In the illustrated embodiment, the cooling medium and food product flow in opposite directions to achieve maximum heat extraction from the heated food product. Flow of the cooling medium and food product may also be, however, in the same direction.

In the vast majority of studies of heat exchangers, the flow through coils are dedicated to single-phase flow, the flow of two or more liquid phases, and/or the flow of a liquid phase carrying one or more solid phases. Little is known in terms of a two-phase flow of a cold liquid-cryogen phase coming in contact with a hot liquid product phase, which, upon contact with the hot product, undergoes a change of phase from liquid to gas. To understand the hydrodynamic (i.e., flow) basics of the two-phase flow of a cold liquid-cryogen phase coming in contact with a hot liquid product phase, it is helpful to understand the fundamentals in single-phase liquid flow through coils. Basic literature that describes single-phase liquid flow patterns and boundary layers in coils or bends includes, for example, M. Rowe, "Measurement and Computations of Flow in Pipe Bends," Journal of Fluid Mechanics, 43 (4), 771-783 (1970).

Figure 2:
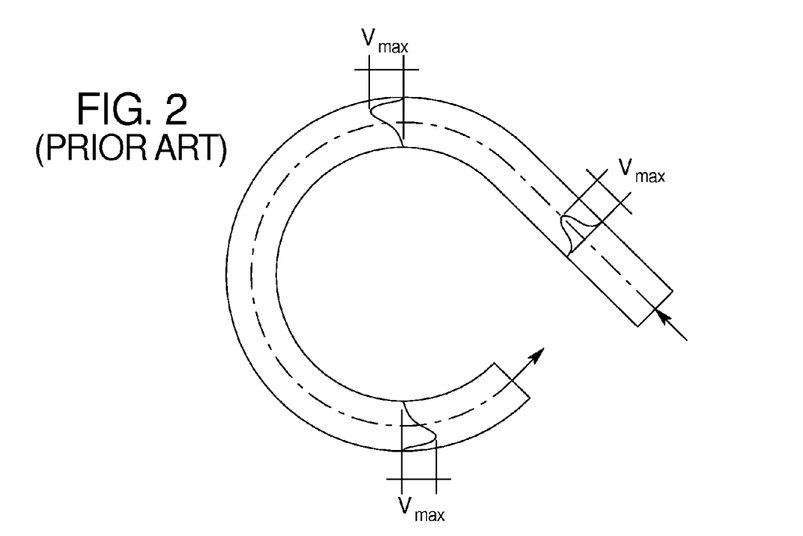
FIG. 2 illustrates a change in velocity profile (e.g., laminar flow) from a straight pipe into a helical coil in accordance with prior art.

Assuming, for discussion purposes, and as shown in FIG. 2, the flow of a liquid in a straight pipe with diameter "d," followed by the flow in a helical coil, whose pipe diameter is also "d," but whose diameter of curvature is "D." Also assuming, for simplicity, that the flow inside the straight pipe, upstream of the helical coil, is in steady-state laminar regime. Under these conditions, it is well known that the velocity profile is a parabola with the maximum (" $v_{max}$ ") located at the centerline of the straight pipe. Necessarily, when the flow enters the helical coil, the centrifugal force acting upon the liquid, $F_c = \rho \, v^2_{max}/(D/2)$, shifts the location of the $v_{max}$ off the centerline, towards the outer wall of the coil, where $\rho$ is liquid density (kg m$^{-3}$), $v_{max}$ is liquid velocity (m s$^{-1}$), (D/2) is radius of curvature of the helical coil (m), and $F_c$ is centrifugal force (N m$^{-3}$), i.e., the force per unit of volume of liquid. The higher the density and the velocity, respectively, the smaller the radius of curvature, the larger the centrifugal force per unit of volume of liquid.

Figure 3A:
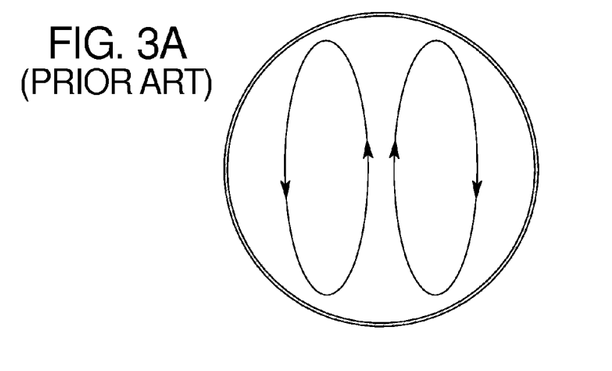
FIG. 3A illustrates the formation of Dean Roll-Cells (e.g., laminar flow) in an inlet cross-section of a helical coil in accordance with prior art.
Figure 3B:
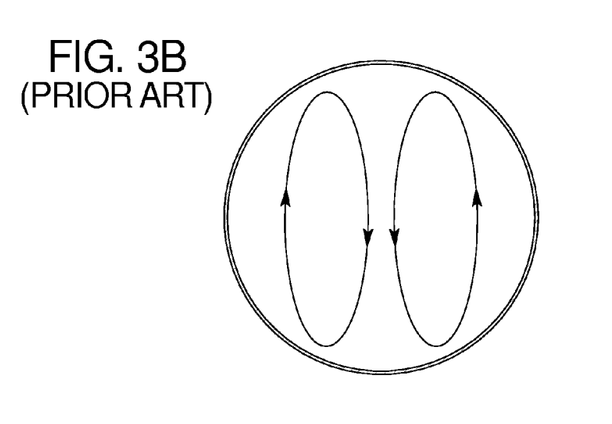
FIG. 3B illustrates the formation of Dean Roll-Cells (e.g., laminar flow) in an outlet cross-section of a helical coil in accordance with prior art.

As a result of the imbalance in flow (i.e., the velocity profile in a helical coil becomes asymmetrical vs. the centerline), a secondary flow ensues in the cross sectional planes perpendicular to the centerline of the helical coil, as shown in FIGS. 3A and 3B. Again, FIGS. 3A and 3B are simplified views of the secondary flow pattern generated in a helical coil with pipe diameter "d," and a diameter of curvature "D," when the liquid velocity is $v_{max}$. As is shown by FIGS. 3A and 3B, the flow-in cross-section (FIG. 3A) and the flow-out cross-section (FIG. 3B) have opposite flow patterns, indicating that mixing occurs in the pipe. This secondary flow is known as Dean Flow and the ensuing flow patterns as Dean Roll-Cells. The practical importance of the Dean Flow is that the Dean Roll-Cells now contribute to the radial mixing of the liquid. In other words, helical coils can and are being utilized as in-line mixers, which do not need anything else but a helical coil design. The magnitude of the secondary flow in helical coils is normally described by the so-called Dean Number $Dn=Re\sqrt{(d/D)}$, a dimensionless quantity; where Re is Reynolds Number corresponding to the straight pipe. One can readily see that in a straight pipe (i.e., diameter of curvature $D \rightarrow \infty$) the Dean Number is zero; that is, no radial mixing takes place in laminar flow.

Figure 4:
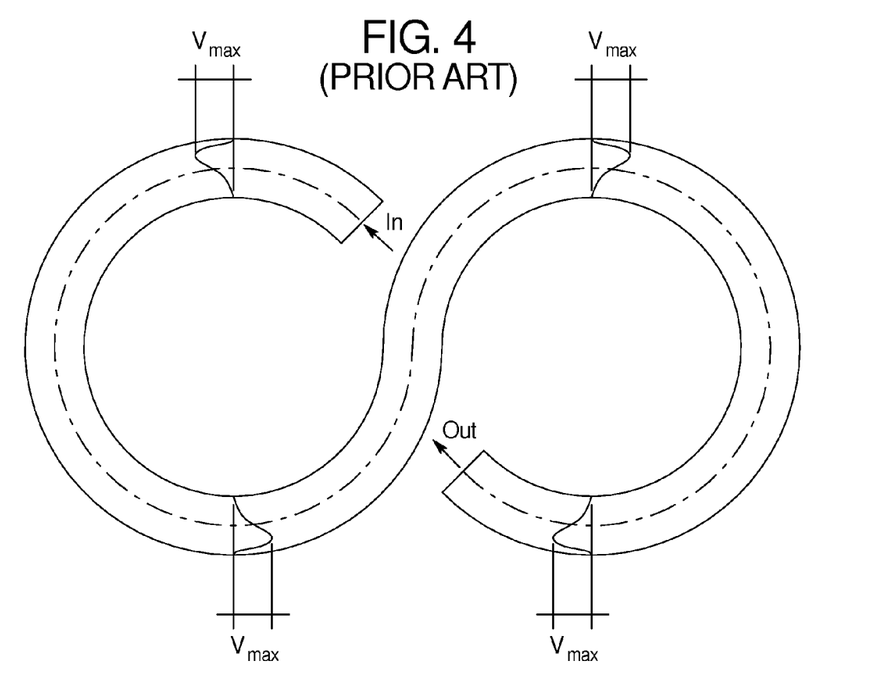
FIG. 4 illustrates a change in velocity profile (e.g., laminar flow) in a double-helical coil in accordance with prior art.

If the flow of the liquid takes place in a double-helical coil, as represented in FIG. 4, then the location of the maximum velocity $v_{max}$ shifts alternatively from one side of the centerline to the other side. More precisely, if the $v_{max}$ was located towards the outer wall of the first coil, then the $v_{max}$ shifts towards the outer wall of the second coil, and so on. Note that the outer wall of the second coil previously was the inner wall of the first coil, respectively, the inner wall of the second coil previously was the outer wall of the first coil. The mechanism that induces the alternating shift of the $v_{max}$ around the centerline of a double-helical coil enhances the mixing inside the double-helical coil. For practical purposes, the double-helical coils are and can be utilized as enhanced in-line mixers due to the combined effects of both the Dean Roll-Cells flow and the effects of the change in flow direction associated with the double helical coils.

Palazoglu and Sandeep investigated the residence time distribution of polydispersions in double-helical coils as related to aseptic processing of particulate foods. "Effect of Holding Tube Configuration on the Residence Time Distribution of Multiple Particles in Helical Tube Flow," Journal of Food Process Engineering, 25, 337-350 (2002). This special application involved the flow of a liquid phase carrying a polydisperse solid phase in a double-helical coil, without any heat transfer. Originating with the Dean Flow effects (i.e., the inherent mixing effects present in double-helical coils), the residence time of the polydispersion was rather uniform.

Howell et al. have shown that it was possible to generate strong radial mixing inside a helical micro-channel coil, under the influence of the Dean Flow, which allowed an effective mixing of two liquids. "Design and Evaluation of a Dean Vortex-Based Micromixer," Lab Chip, 4,663-669 (2004).

Figure 5:
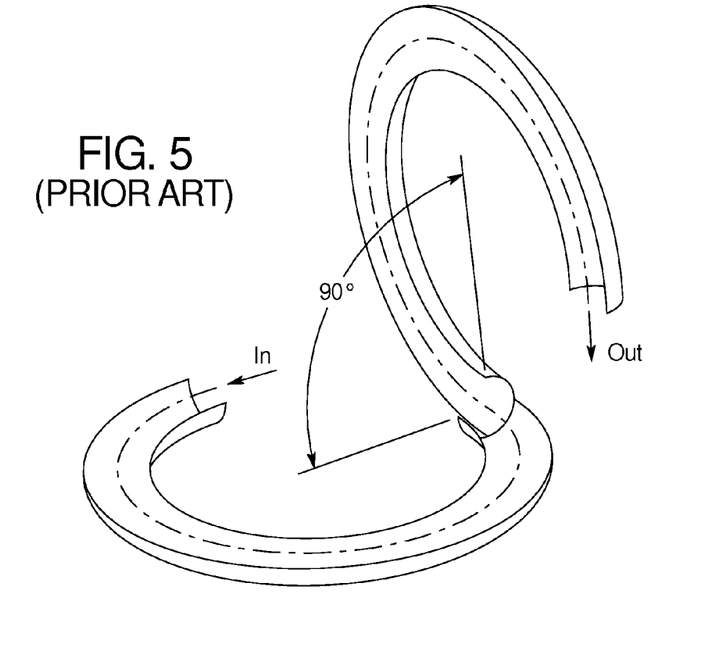
FIG. 5 illustrates the geometry of an inverted double-helical coil in accordance with prior art.

Kumar and Nigam advanced the concept of bent helical coils, where a first helical coil is followed by a second helical coil in a plane at 90° referenced to the plane of the first helical coil. "Numerical Simulation of Steady Flow Fields in Coiled Flow Inverter," International Journal of Heat and Mass Transfer, 48, 4811-4828 (2005). In a simplified manner, this geometry is illustrated in FIG. 5, where this geometry could be described as an inverted double-helical coil. At the transition from the first coil to the second coil, the Dean Roll-Cells rotate by 90°, adding to the mixing effects already discussed under the double-helical coil in FIG. 4. Kumar and Nigam conducted the numerical simulation in single liquid-phase for both the flow fields and the thermal fields, where the heating was due to a constant-temperature-wall assumption. The inverted double-helical coil geometry was also studied by Castelain and Legentilhomme for the express purpose of residence time distribution of pseudoplastic liquids in different configurations of helical coils or chaotic systems. "Residence Time Distribution of Purely Viscous non-Newtonian Fluid in Helically Coiled or Spatially Chaotic Flows," Chemical Engineering Journal, 120, 181-291 (2006).

Figure 6:
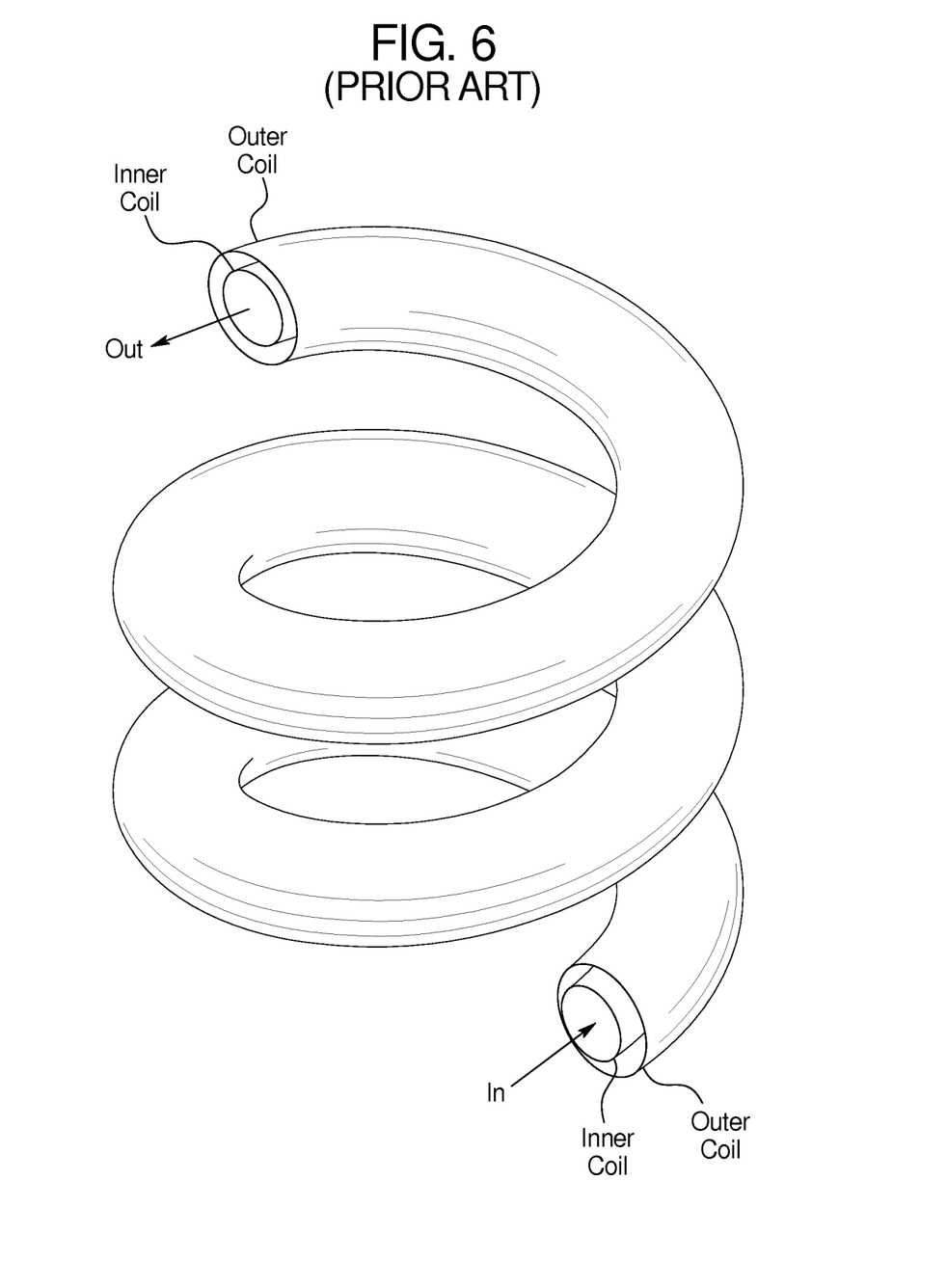
FIG. 6 illustrates a perspective view of the geometry of a double-pipe helical coil heat exchanger in accordance with prior art.

As has been demonstrated, helical coils have been utilized in some types of shell-and-tube heat exchangers for quite some time. These types of heat exchangers are well established in the industrial applications for indirect heat transfer. The enhanced heat transfer attributed to the coil-in-shell heat exchangers originates with the effects induced by the Dean Flow inside the helical coil. Additionally, the shell of these heat exchangers can be replaced with an outer helical coil, leading to the so-called double-pipe helical heat exchangers. These heat exchangers are especially effective for heat transfer, given the secondary flow (i.e., Dean Flow) developed within both the inner helical coil and the annular space between the inner helical coil and the outer helical coil. The geometry of a double-pipe helical heat exchanger is illustrated in FIG. 6. A study of the hydrodynamics of double-pipe helical exchangers can be found in the work done by T. J. Rennie, "Numerical and Experimental Studies of a Double-Pipe Heat Exchanger," Ph.D. Thesis, McGill University, Montreal, Canada (2004).

In contrast to indirect heat exchange, one of the advantages of direct liquid-cryogen injection is the absence of a conventional heat transfer surface. This is very appealing because, in the absence of a wall that separates the hot product from the cooling agent, a major heat transfer resistance (e.g., the heat transfer by conduction through the wall) is eliminated. Additionally, the lack of a heat transfer surface results in the absence of fouling (or scaling) of the solid wall that separates the two heat-exchanging streams. Benefits provided by the absence of fouling include, for example, better heat transfer efficiency, easier cleaning of the heat exchanger, and improved quality of the final product. Furthermore, if the direct liquid-cryogen injection is efficiently employed, the heat transfer between the two phases (e.g., the food product being one phase and the liquid/gas cryogen being the other) should be highly efficient, and best described as a "volumetric heat transfer," compared with the indirect heat transfer through a heat transfer surface.

There are, however, technical hurdles associated with the direct liquid-cryogen injection for cooling applications. One of these hurdles, for instance, is the incompatibility of the carbon dioxide with the food product itself, where carbon dioxide can measurably change the pH of the food product and negatively affect the properties of the food product. Other hurdles are related to, for example, the critical parameters of the nitrogen (about 126 K as the critical temperature, and about 34 barA as the critical pressure), which call attention to the difficulties of manufacturing, storing, and handling the liquid nitrogen for practical applications. And yet another hurdle, for instance, is the fact that many food products are rather viscous liquids, which (upon direct liquid-cryogen injection cooling) become relatively more viscous, with the tendency to create stable foams, respectively, considerably decreasing the density of the final product. While creating stable foam might be preferred for some food products, generally it is desirable to be able to expel the gaseous phase from the food product upon cooling.

Further, given the exceptionally low latent heat of evaporation of liquid nitrogen, for instance, it may not be as efficient as desired in the cooling processes. Comparatively, if the latent heat of evaporation of water is about 2257 kJ $kg^{-1}$, then the latent heat of evaporation for liquid nitrogen is about 199 kJ $kg^{-1}$ (i.e., only 8.80% of the value for water). To enhance the efficiency of direct liquid-nitrogen injection cooling, the heat exchange should be designed for extracting not only the latent heat of evaporation but also the sensible heat of the cold nitrogen vapors. When adding up the total heat content, the amount of energy that could be exchanged with liquid nitrogen is about 360 kJ/kg (i.e., about 16.00% of the value for water). In itself, even this increase in the heat content that can be exchanged with the liquid nitrogen is rather small, compared with the latent heat of evaporation of water. As such, to make direct liquid-cryogen more economical for industrial or large-scale use, Applicants sought to improve the equipment and processes used for direct liquid-cryogen injection cooling.

The present disclosure is directed to improving the design and process efficiency of equipment used for direct liquid-cryogen injection cooling. In terms of the design, and based on the behavior of the boundary layers in coils, Applicants have developed a device that achieves maximum extraction of the heat content from a heated food product, and complete separation of the gaseous cryogen phase from the cooled product, while avoiding the formation of a stable foam. The devices generally include a double helical (e.g., s-shaped) coil in a phase-mixing-cooling section of the cooling process, and a helical (e.g., circular shaped) coil in a phase-separation-cooling section. The double helical coil and the helical coil are separated by an intermediate section having a back-pressure valve. In terms of the process efficiency, and as mentioned above, the device is able to achieve maximum extraction of the heat content from a heated food product (taking place inside the double helical coil section), and complete separation of the gaseous cryogen phase from the cooled product (taking place inside the helical coil section), while avoiding the formation of a stable foam.

In an embodiment, the present disclosure provides a direct-cryogen injection cooling device including two check valves, a double-helical coil, a backpressure valve, and a helical coil. The piping network connecting these basic elements can be linear or non-linear, depending on the particular design of the device. The double-helical coil is configured to mix two phases, the hot liquid product phase and the cold liquid-cryogen phase. Under these conditions, the double-helical coil acts as a phase-mixing-cooling section.

The helical coil is intended to separate the two resulting phases, a cold liquid product phase and a gaseous cryogen phase. Accordingly, the helical coil plays the role of a phase-separation-cooling section. Since throughout both the double-helical coil and the helical coil the liquid product phase and the cryogen phase are in direct contact, a heat transfer between the two phases takes place continuously. Inside the double-helical coil, the liquid cryogen undergoes a phase change from liquid to cold gas. Inside the helical coil, the cold gaseous cryogen phase absorbs heat from the liquid product phase and correspondingly warms up. Essentially, upon direct contact with the hot liquid product phase, in the phase-mixing-cooling section (i.e., the double-helical coil), the local flow through the coil may be a three-phase flow, hot liquid product phase, cold liquid-cryogen phase, and cold gaseous-cryogen phase. By the time the product and the cryogen reach the separation-cooling section (i.e., the helical coil), the flow through the coil becomes a two-phase flow, the cold liquid product phase and the warm gaseous-cryogen phase.

The backpressure valve located after the double-helical coil and before the helical coil is designed to control the rate of expansion of the gaseous cryogen phase inside the double-helical coil to control the contact time between the liquid product phase and the cryogen phase within the phase-mixing-cooling section. The direct-cryogen injection cooling device can also include two check valves located at the inlet to the double-helical coil. One check valve can be used for the admission of the hot liquid product phase and the other check valve can be used for the admission of the cold liquid-cryogen phase. The role of the check valves is to prevent any backflow from the phase-mixing-cooling section (i.e., double-helical coil) of the cooling device, into the supply piping networks of the hot liquid product and cold liquid nitrogen.

In at least two additional embodiments, two hybrid direct-indirect cooling heat exchangers are provided for the purpose of making the cooling operation more economical in terms of liquid-cryogen consumption. Instead of accommodating the entire cooling load through direct liquid-cryogen injection, a portion of the cooling load can be taken by the indirect cooling from a cooling medium flowing outside the double-helical coil, as will be discussed further below. Thus, the amount of liquid cryogen can be measurably lowered, while the two-phase flow induced by the liquid cryogen injection within the double-helical coil enhances the heat transfer coefficient associated with the indirect heat transfer.

In the first of these two additional embodiments, the hybrid direct-indirect cooling heat exchanger includes an inner double-helical coil housed within an outer double-helical coil—a so-called double pipe design configuration. The inner double-helical coil is configured to mix two phases (i.e., the hot liquid product phase and the cold liquid-cryogen phase). Under these conditions, the inner double-helical coil acts as a phase-mixing-cooling section. However, the amount of liquid cryogen directly injected now is measurably lowered because now the entire cooling load doesn't need to be entirely accommodated by direct cryogen injection. Instead, the cooling medium circulated through the outer double-helical coil will pick up the rest of the cooling load by indirect heat transfer.

In the second of the two additional embodiments, the hybrid direct-indirect cooling heat exchanger includes an inner double-helical coil housed in a shell (e.g., a fluid-tight chamber). The double-helical coil is configured to mix two phases (i.e., the hot liquid product phase and the cold liquid-cryogen phase). Under these conditions, the double-helical coil acts as a phase-mixing-cooling section. However, the amount of liquid cryogen directly injected now is measurably lowered because now the entire cooling load doesn't need to be entirely accommodated by direct cryogen injection. Instead, the cooling medium circulated through the shell will pick up the rest of the cooling load by indirect heat transfer.

Figure 7:
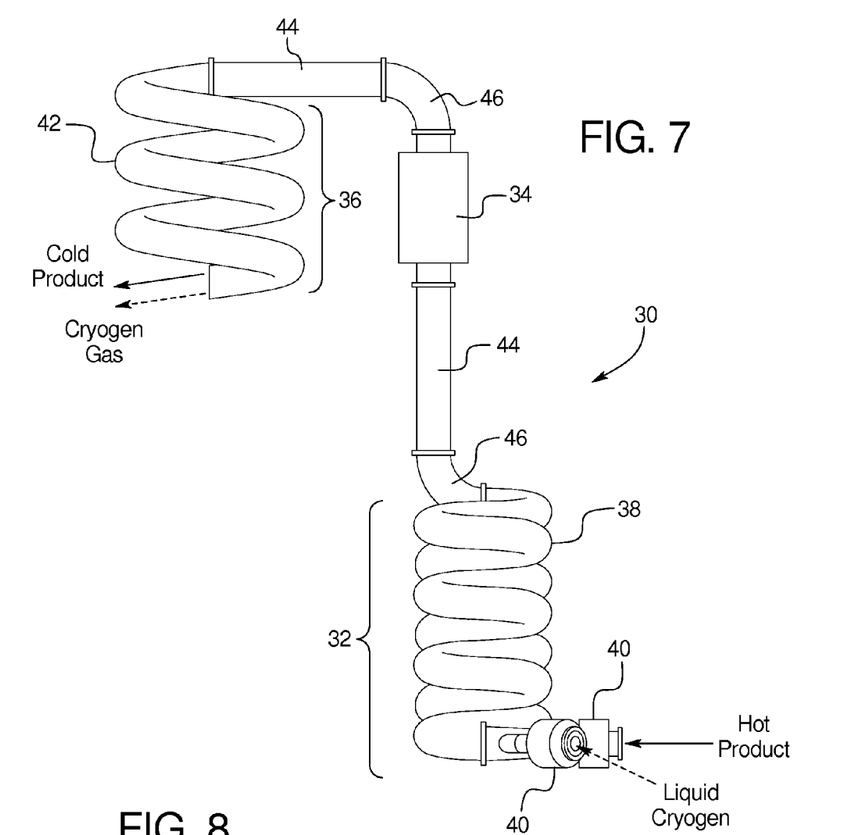
FIG. 7 illustrates a side view of a direct cryogen injection cooling device in accordance with an embodiment of the present disclosure.

Turning now to the figures, and in particular to FIG. 7, an embodiment of a direct-cryogen injection cooling device of the present disclosure is illustrated. The direct-cryogen injection cooling device 30 may be an energy efficient direct-cryogen injection cooling device that is able to achieve maximized heat extraction from a heated food product, and complete separation of the gaseous cryogen phase from the cooled food product, while avoiding the formation of a stable foam. The increased energy efficiency originates with the enhanced mixing between two phases, the hot liquid product phase and the cold liquid cryogen phase, induced by the secondary flow (i.e., Dean Flow) associated with coils, as explained above. The skilled artisan will appreciate that any suitable cryogenic liquids may be used. In other words, a liquid cryogen of the present disclosure may be any liquefied gas at a very low temperature such as, for example, liquid oxygen, liquid nitrogen, liquid carbon dioxide, or liquid argon.

As shown in FIG. 7, and in an embodiment of the preset disclosure, a device 30 for direct liquid-cryogen injection cooling is shown. Device 30 includes a phase-mixing-cooling section 32, a backpressure valve 34, and a phaseseparation-cooling section 36. The heat-exchanging streams (e.g., the heated food product and the liquid cryogen) are introduced at the base of a double-helical coil 38 through corresponding check valves 40, and travel through backpressure valve 34 and a helical coil 42 before exiting device 30 as cryogen gas and a cold food product.

Once the two heat exchanging streams (e.g., the heated food product and the liquid cryogen) are introduced into respective inlet valves 40, the two heat exchanging streams form a two-phase mixture. Inside double-helical coil 38, the alternating shift of the velocity profile around the centerline of double-helical coil 38 enhances the mixing due to the combined effects of both the Dean Roll-Cells flow and the effects of the change in flow direction associated with the double-helical coils, as discussed above with respect to FIGS. 3A, 3B and 4. The two phases, the liquid product phase and the cryogen phase, continue to stay in contact, and therefore exchange heat between them, throughout both double-helical coil 38 and helical coil 36. However, while inside double-helical coil 38, the boundary layers of the two phases are forced to cross each other (thus, enhanced mixing). The configuration of double-helical coil 38 will force the two phases to exchange a maximum amount of heat between them.

By comparison, the boundary layers of the two phases inside helical coil 42 tend to remain separate, given the flow of two streams, with different densities, in a centrifugal field (thus, enhanced separation). The centrifugal field is created by the flow inside helical coil 42, along a curved path with a constant diameter of curvature. The result ought to be not only enhanced separation, but also avoiding the formation of a stable foam. Combined, an enhanced mixing for heat transfer (between the hot liquid product phase and the cold liquid cryogen phase) inside double-helical coil 38 and an enhanced separation (of the cold liquid product phase from the cryogen gas phase) inside helical coil 42 underline the differentiation between the devices of the present disclosure and the devices known from the prior art.

Figure 8:
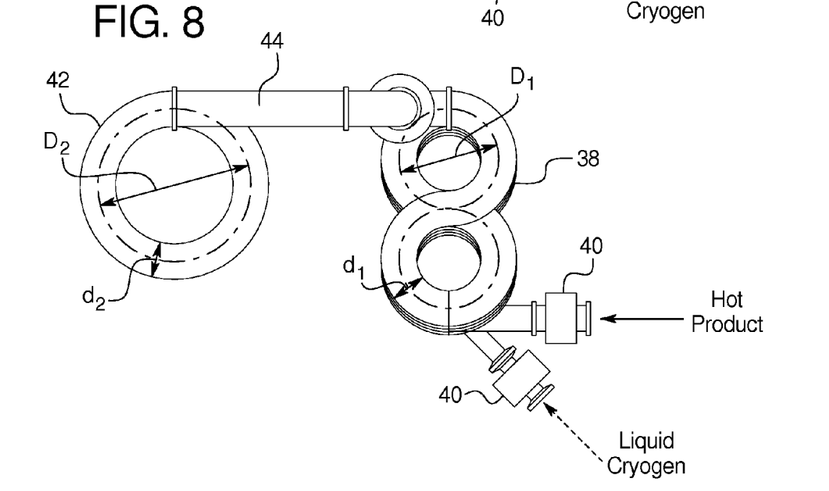
FIG. 8 illustrates a top view of the direct cryogen injection cooling device of FIG. 7 and in accordance with an embodiment of the present disclosure.

FIGS. 7 and 8 illustrate a pilot-plant-size direct liquid-cryogen injection cooling device 30, designed for an incoming hot liquid product at about 3.6 kg min$^{-1}$, inlet temperature 85° C., outlet temperature 20° C., and specific heat about 3350 J kg$^{-1}$° C.$^{-1}$. If the energy that could be exchanged with liquid cryogen is about 360 kJ kg$^{-1}$, the corresponding flow rate of liquid cryogen is about 2.8 kg min$^{-1}$. Under these conditions, the proposed physical parameters of double helical coil 38 (i.e., phase-mixing-cooling section 32) may include a pipe diameter ("$d_1$") of about 1.870 inches (corresponding to two-inch outer diameter pipe), a diameter of curvature ("$D_1$") of about 6 inches, and total number of turns (e.g., revolutions) of about 3.5, where diameter of curvature, $D_1$, is referenced to the centerline, as shown in FIG. 8, which is a top view of the device 30 of FIG. 7. Similarly, the proposed physical parameters of helical coil 42 (i.e., phase-separation-cooling section 36) may include a pipe diameter ("$d_2$") of about 1.870 inches (corresponding to two-inch outer diameter pipe), a diameter of curvature ("$D_2$") of about 9 inches, and total number of turns (e.g., revolutions) of about 3, where diameter of curvature $D_2$ is referenced to the centerline, as shown in FIG. 8.

The skilled artisan will appreciate, however, that the devices of the present disclosure are not limited to the dimensions of the present exemplary embodiment, and that the devices may have any dimensions or number of turns of the coils necessary to accomplish desired processing parameters. For example, double-helical coil 38 may have diameter, $d_1$, ranging from about 0.5 inches to about 5 inches, or from about 1 inch to about 4 inches, or may be about 2 inches, or about 3 inches. Double-helical coil 38 may also have a diameter of curvature, $D_1$, ranging from about 2 inches to about 10 inches, or from about 3 inches to about 9 inches, or from about 4 inches to about 8 inches, or from about 5 inches to about 7 inches, or about 6 inches. Double-helical coil 38 may also have any number of turns necessary to accomplish desired processing parameters. For example, double-helical coil 38 may have from about 1 to about 5 turns, or from about 2 to about 4 turns, or may have about 3 turns or about 3.5 turns.

Likewise, helical coil 42 may have any dimensions necessary to accomplish desired processing parameters. For example, helical coil 42 may have diameter, $d_2$, ranging from about 0.5 inches to about 5 inches, or from about 1 inch to about 4 inches, or may be about 2 inches, or about 3 inches. Helical coil 42 may also have a diameter of curvature, $D_2$, ranging from about 5 inches to about 13 inches, or from about 6 inches to about 12 inches, or from about 7 inches to about 11 inches, or from about 8 inches to about 10 inches, or about 9 inches. Helical coil 42 may also have any number of turns necessary to accomplish desired processing parameters. For example, helical coil 42 may have from about 1 to about 5 turns, or from about 2 to about 4 turns, or may have about 3 turns.

In order to increase the residence-contact time of the two phases flowing inside double-helical coil 38, backpressure valve 34 is designed to lower the expansion of the cryogen gas. Given the critical parameters (e.g., temperature and pressure) of the nitrogen, for instance, it is practically unfeasible to consider backpressures that could keep the liquid nitrogen from evaporating within double-helical coil 38. Instead, backpressures in the range of 3-5 barA are envisaged to lower the expansion of the cryogen gas to the point of a more uniform and continuous flow of the two boundary layers of the two mixing phases. In an embodiment, backpressure valve 34 is a 2-inch-sanitary pinch valve such as those manufactured by Elasto-Valve Rubber Products, Inc., Sudbury, Ontario, Canada. Accordingly, the flow inside backpressure valve 34 is rather free of any obstruction. In reality, the closing of backpressure valve 34 might be minimal, given the fact that some backpressure is generated by the flow through the entire device 30 made of the two coils 38 and 42. For given flow rates of the hot food product and the liquid cryogen, the efficiency of the direct liquid-cryogen injection cooling depends on the design parameters of double-helical coil 38, that is, pipe diameter $d_1$, diameter of curvature $D_1$, and number of turns (revolutions), and the level of backpressure applied.

As discussed briefly above, backpressure valve 34 is located between phase-mixing-cooling section 32 and phase-separation-cooling section 36. The sections of piping upon which backpressure valve 34 is located, and between backpressure valve 34 and double-helical coil 38, and backpressure valve 34 and helical coil 42 are not critical for the present disclosure. In an embodiment, however, and as shown in FIG. 7, double-helical coil 38 may be connected to a linear pipe 44 by an elbow pipe 46. Linear pipe 44 may be connected to backpressure valve 34, which is, in turn, connected to a second elbow pipe 46. Helical coil 42 may be connected to second elbow pipe 46 by a second linear pipe 44. Linear pipes 44 and elbow pipes 46 may have any length or diameter known in the art and sufficient for allowing the two phases to flow therethrough.

With respect to a present device 30, where a two-phase flow is involved, the combination between double-helical coil 38 (where phase-mixing and -cooling take place) and helical coil 42 (where phase-separation and -cooling take place) proves to be a unique and novel combination that allows for advancing direct liquid-cryogen injection cooling of pumpable products beyond the state-of-the-art. Particularly, the resulting equipment allows an efficient cooling, while the possibility of stable-foam formation can be minimized.

In two additional embodiments, two hybrid direct-indirect cooling heat exchangers are provided for the purpose of making the cooling operation more economical in terms of liquid-cryogen consumption. In the disclosed hybrid embodiments, instead of accommodating the entire cooling load through direct liquid-cryogen injection, a portion of the cooling load can be taken by the indirect cooling from a cooling medium flowing outside the double-helical coil. The advantage is that the amount of liquid cryogen can be measurably lowered, while the two-phase flow induced by the liquid cryogen injection within the double-helical coil enhances the heat transfer coefficient associated with the indirect heat transfer.

Figure 9:
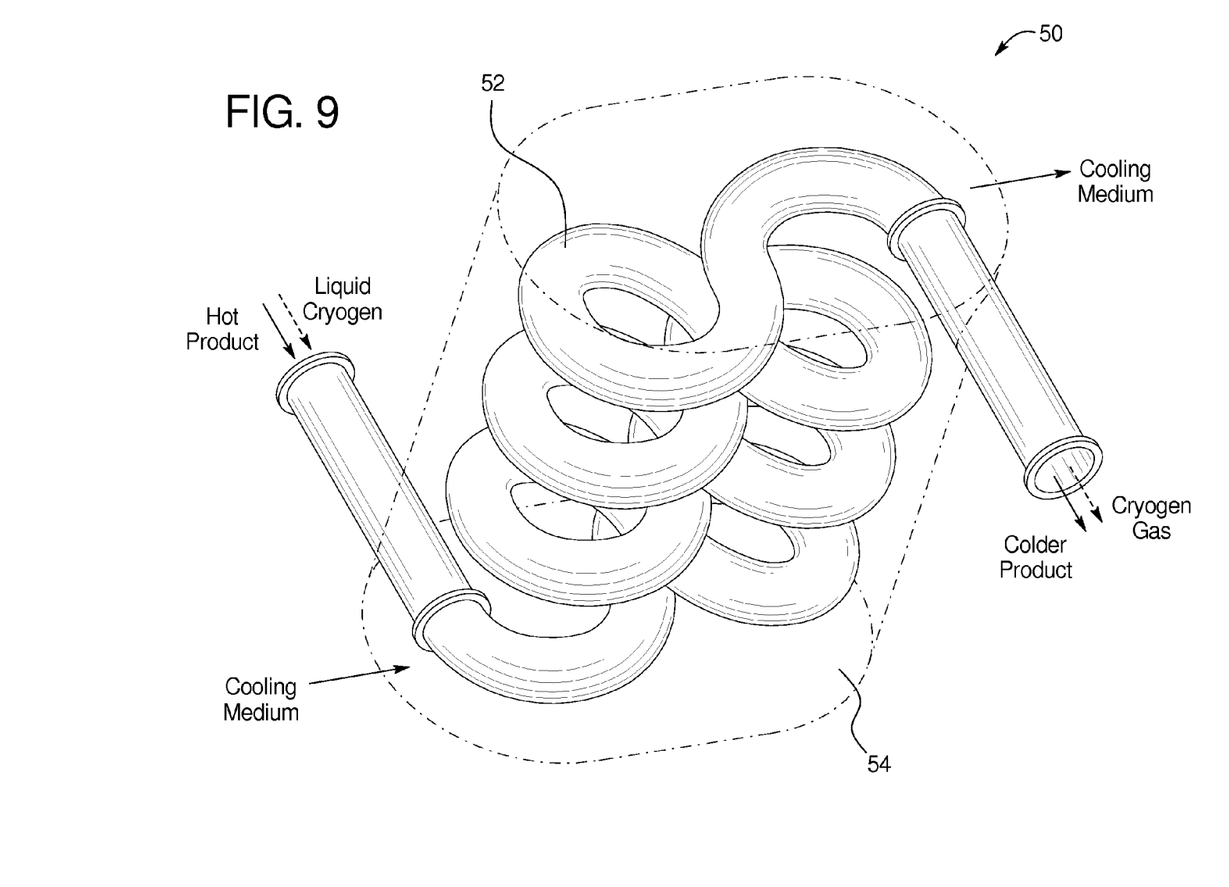
FIG. 9 illustrates a perspective view of a double-helical coil in a hybrid direct-indirect injection heat exchanger in accordance with an embodiment of the present disclosure.

In a first hybrid embodiment, and as shown in FIG. 9, a hybrid direct-indirect cooling heat exchanger 50 includes an inner double-helical coil 52 housed in a shell 54 (e.g., a fluid-tight chamber). A cooling medium flows through shell 54 and over double-helical coil 52, which is configured to mix two phases, the hot liquid product phase and the cold liquid-cryogen phase. Under these conditions, double-helical coil 52 acts as a phase-mixing-cooling section. The advantages of such a device 50 are twofold: first, the amount of liquid nitrogen is measurably lowered; and second, the two-phase flow induced by the liquid nitrogen injection inside double-helical coil 52 enhances the overall heat transfer coefficient associated with the indirect heat transfer.

The hybrid direct-indirect cooling concept illustrated in FIG. 9 may also be applied to a helical coil (not illustrated) in addition to, or instead of, the double-helical coil 52. In this manner, an inner helical coil may be housed within a shell, similar to the geometry illustrated in FIG. 9, where a helical coil replaces the shown inner double helical coil 52. A cooling medium flows through shell 54 and over the inner helical coil. As such, either or both of the helical coil and double-helical coil 52 may be housed in shells in a tube-in-shell configuration. In the same manner, any piping network (not illustrated) intermediate the helical coil and double-helical coil 52 may also be housed in shells in a tube-in-shell configuration.

Figure 10:
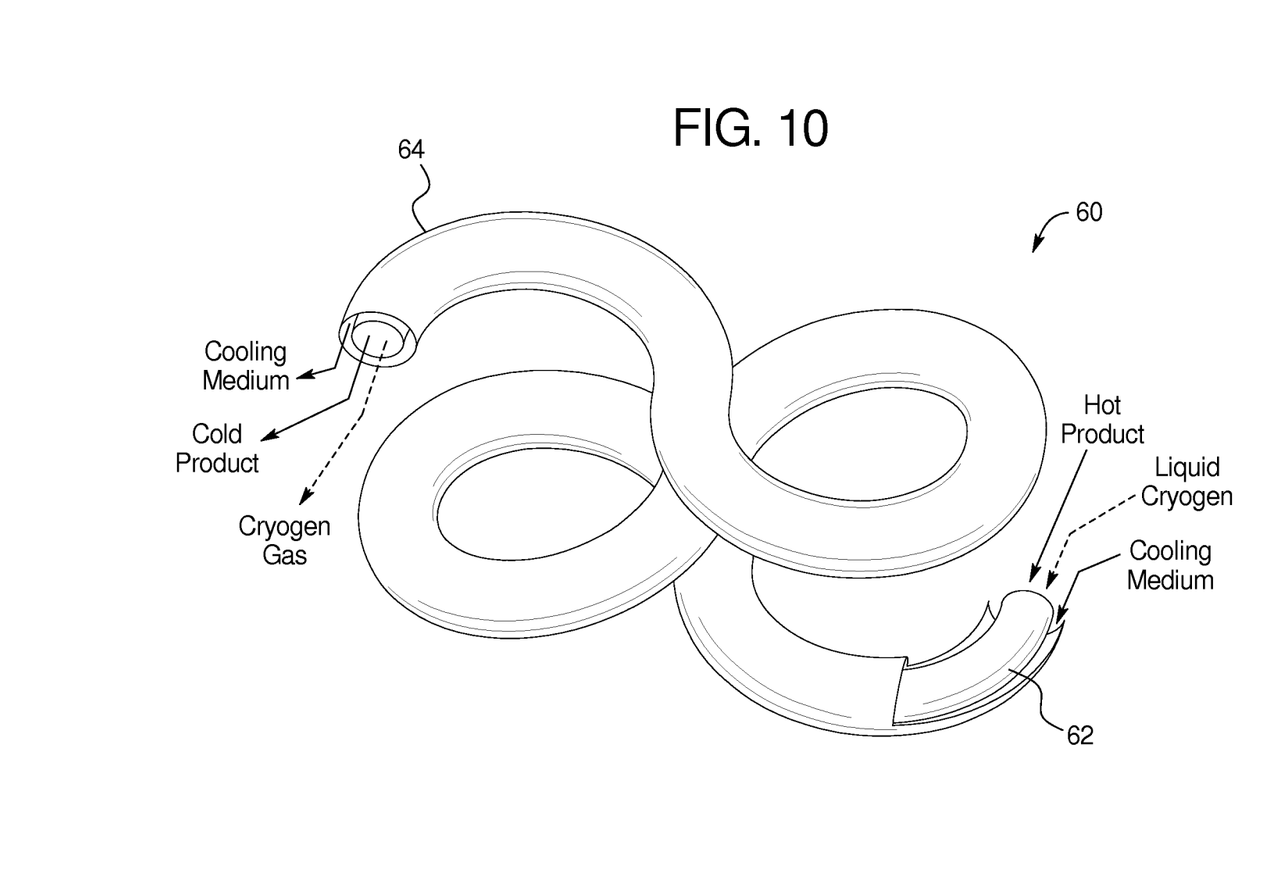
FIG. 10 illustrates a perspective view of a double-helical coil in a hybrid direct-indirect injection heat exchanger in accordance with an embodiment of the present disclosure.

In a second hybrid embodiment, and as shown in FIG. 10, a hybrid direct-indirect cooling heat exchanger 60 includes an inner double-helical coil 62 housed within an outer double-helical coil 64, a so-called double pipe design configuration. A cooling medium flows through the annular channel formed between outer double-helical coil 64 and inner double-helical coil 62. Inner double-helical coil 62 is configured to mix two phases, the hot liquid product phase and the cold liquid-cryogen phase. Under these conditions, inner double-helical coil 62 acts as a phase-mixing-cooling section.

The hybrid direct-indirect cooling concept illustrated in FIG. 10 may also be applied to a helical coil (not illustrated) in addition to, or instead of, inner double helical coil 62. In this manner, and in an embodiment, an inner helical coil may be housed within an outer helical coil, similar to the geometry illustrated in FIG. 6. A cooling medium flows through the annular channel formed between the outer helical coil and the inner helical coil.

As such, it should be apparent to the skilled artisan that the devices of the present disclosure may be used for several different purposes. For example, the devices of the present disclosure may be used for direct liquid-cryogen injection cooling, where a hot liquid-product phase comes in contact with a cold liquid-cryogen phase, where a distinct two-phase flow ensues, and whose boundary layers are forced to cross each other according to the changes in the flow direction induced by the double-helical coil, further forcing the two phases to exchange the maximum amount of heat between them.

The devices of the present disclosure may also be used for direct steam injection, where a cold liquid-product phase comes in contact with the hot steam phase, where a distinct two-phase flow ensues, and whose boundary layers are forced to cross each other according to the changes in the flow direction induced by the double-helical coil, further forcing the two phases to exchange the maximum amount of heat between them.

The devices of the present disclosure may further be used for indirect heat transfer for heating or cooling, where a hot/cold product flows through the double-helical coil, while a heating/cooling medium flows outside the double-helical coil through either a double-helical coil or a shell that envelops the inner double-helical coil.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for direct liquid-cryogen injection cooling, the method comprising:
   injecting a heated product and a liquid cryogen into a double-helical pipe to form a two-phase mixture therein;
   causing the two-phase mixture to traverse the double-helical pipe and a backpressure valve located downstream of the double-helical pipe;
   causing the two-phase mixture to traverse a helical pipe located downstream of the backpressure valve, the two-phase mixture is separated within the helical pipe into a cooled product and a gaseous cryogen phase; and
   dispensing the cooled product and the gaseous cryogen phase from the helical pipe.

2. The method of claim 1, wherein the double-helical pipe comprises a phase-mixing-cooling section of the device.

3. The method of claim 2, wherein the double-helical pipe causes the heated product and the liquid cryogen to mix to form the two-phase mixture and to exchange a maximum amount of heat between the two phases.

4. The method of claim 1, wherein the helical pipe comprises a phase-separation-cooling section of the device.

5. The method of claim 4, wherein the helical pipe is configured to induce a two-phase flow between the cooled product and the gaseous cryogen phase, the cooled product flows at an outer portion of an interior of the helical pipe and wherein the gaseous cryogen phase flows at an inner portion of the interior of the helical pipe.

6. The method of claim 1, wherein the heated product and the liquid cryogen are injected into the double-helical pipe through first and second inlet valves, respectively.

7. The method of claim 1, wherein the backpressure valve is configured to increase a residence time of the two-phase mixture within the double-helical pipe.

\* \* \* \* \*